(12) United States Patent
Fredlund et al.

(10) Patent No.: US 8,599,299 B2
(45) Date of Patent: Dec. 3, 2013

(54) SYSTEM AND METHOD OF PROCESSING A DIGITAL IMAGE FOR USER ASSESSMENT OF AN OUTPUT IMAGE PRODUCT

(75) Inventors: John R. Fredlund, Rochester, NY (US); Joseph A. Manico, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 58 days.

(21) Appl. No.: 13/239,050

(22) Filed: Sep. 21, 2011

(65) Prior Publication Data

US 2012/0008169 A1 Jan. 12, 2012

Related U.S. Application Data

(60) Division of application No. 11/643,496, filed on Dec. 21, 2006, now Pat. No. 8,068,162, which is a continuation of application No. 10/061,385, filed on Feb. 1, 2002, now abandoned.

(51) Int. Cl.
*H04N 5/222* (2006.01)

(52) U.S. Cl.
USPC .................. 348/333.11; 348/333.12

(58) Field of Classification Search
USPC ............. 348/231.99, 231.7, 333.01–333.04
See application file for complete search history.

(56) References Cited

U.S. PATENT DOCUMENTS

| | | | |
|---|---|---|---|
| 5,845,166 | A | 12/1998 | Fellegara et al. |
| 6,006,039 | A | 12/1999 | Steinberg et al. |
| 6,018,397 | A | 1/2000 | Cloutier et al. |
| 6,147,704 | A * | 11/2000 | Ito et al. ............. 348/222.1 |
| 6,285,410 | B1 | 9/2001 | Marni |
| 6,504,575 | B1 | 1/2003 | Ramirez et al. |
| 6,587,596 | B1 | 7/2003 | Haeberli |
| 6,812,961 | B1 | 11/2004 | Parulski et al. |
| 6,819,442 | B2 | 11/2004 | Takahashi |
| 6,906,746 | B2 | 6/2005 | Hijishiri et al. |
| 6,930,718 | B2 | 8/2005 | Parulski et al. |
| 7,016,869 | B1 | 3/2006 | Haeberli |
| 7,034,880 | B1 | 4/2006 | Endsley et al. |
| 7,082,227 | B1 | 7/2006 | Baum et al. |

(Continued)

FOREIGN PATENT DOCUMENTS

| | | |
|---|---|---|
| JP | 11-191057 | 7/1999 |
| JP | 2000-182043 | 6/2000 |
| JP | 2001-024927 | 1/2001 |
| JP | 2001-169098 | 6/2001 |

OTHER PUBLICATIONS

Final Office Action on U.S. Appl. No. 10/061,385, mailed Sep. 21, 2006.
Final Office Action on U.S. Appl. No. 11/643,496, mailed Jul. 1, 2010.
Non-Final Office Action on U.S. Appl. No. 10/061,385, mailed Aug. 25, 2005.

(Continued)

*Primary Examiner* — Kelly L Jerabek

(57) ABSTRACT

A system and method of processing a digital image for user assessment of an output image product intended to be generated using the digital image. The method comprises the steps of: (a) accessing the digital image using an imaging device having a viewing member; (b) selecting the output image product intended to include the digital image; (c) digitally modifying at least a portion of the digital image using the imaging device to produce a substantially accurate representation of at least a portion of the output image product; and (d) displaying, using the viewing member, for assessment by the user, the substantially accurate representation of the at least a portion of the output image product.

14 Claims, 9 Drawing Sheets

(56) References Cited

U.S. PATENT DOCUMENTS

| | | |
|---|---|---|
| 7,576,752 B1 | 8/2009 | Benson et al. |
| 7,965,310 B2 | 6/2011 | Endsley et al. |
| 2001/0022624 A1 | 9/2001 | Tanaka et al. |
| 2002/0093678 A1 | 7/2002 | Skidgel et al. |
| 2003/0090574 A1 | 5/2003 | Seaman et al. |
| 2003/0103156 A1 | 6/2003 | Brake et al. |

OTHER PUBLICATIONS

Non-Final Office Action on U.S. Appl. No. 11/643,496, mailed Jan. 19, 2011.

Non-Final Office Action on U.S. Appl. No. 11/643,496, mailed Jan. 8, 2010.

Notice of Allowance on U.S. Appl. No. 11/643,496, mailed Jul. 28, 2011.

* cited by examiner

SYSTEM AND METHOD OF PROCESSING A DIGITAL IMAGE FOR USER ASSESSMENT OF AN OUTPUT IMAGE PRODUCT

CROSS-REFERENCE TO RELATED APPLICATION

This application is a divisional of prior U.S. patent application Ser. No. 11/643,496, filed Dec. 21, 2006 now U.S. Pat. No. 8,068,162, which is a continuation of U.S. patent application Ser. No. 10/061,385, filed Feb. 1, 2002 now abandoned, each of which is incorporated herein by reference in its entirety.

FIELD OF THE INVENTION

The present invention relates generally to the field of digital image processing. More particularly, the present invention relates to processing of digital information output in a manner that provides a user with information for assessment of an output image product.

BACKGROUND OF THE INVENTION

Digital images can be captured using a digital image capture device, such as a digital camera. Alternatively, a film scanner can be used to convert a visual image into a digital image. The digital image can be manipulated using computer software, with the manipulation of the digital image including zooming, cropping, and image magnification whereby the original image is converted into an output image intended for an output image product. The output image product can be a hardcopy print produced by means of an appropriate printer, such as an optical printer, digital printer, ink jet printer, thermal printer, or other known printer system. The output image product can also be a mug, tee-shirt, CD, or other product comprising an image.

The output image product is dependent on several factors, including the film scanner resolution, the resolution of the digital image capture device, the resolution of the output device, and the output image product being produced. In addition, the original image in its manipulated form is displayed on a computer monitor or display. This displayed image is dependent on the resolution of the display, and may not be an accurate representation of the output image product.

It is often not apparent to a user of image processing software what selection of image processing parameters (i.e., zoom, crop, magnification) will cause the resultant output image product to be degraded to the point at which the reproduced image is considered unsatisfactory; at least not until the output image product is produced, at which time the output media is wasted and the user is dissatisfied with the service. Nor does the unsatisfactory appearance of the output image product give any indication to the user that an alternative image parameter setting can produce a satisfactory output image product.

It is known that images which reside on negatives of known formats require known magnifications to produce standard size photographic prints. U.S. Pat. No. 6,018,397 (Cloutier et al.) discloses an apparatus and method for providing to a user an assessment of hardcopy output image quality by establishing a boundary level of acceptable hardcopy print quality level based on selected image print size and printing magnification. While this apparatus and method has achieved certain degrees of success in particular applications, the apparatus and method is based on a grain and sharpness model of photographic negatives of a known input format, such as 110 and 35 mm.

In addition, content specific user preferences need to be accounted for. That is, while an image may appear unacceptable to a disinterested third party, the same image may be more than satisfactory to a user of the image due to the content of the image.

With digital images, the digital image data may or may not be available in a known or standard format. For example, an enlargement from a mega-pixel digital camera will most likely differ in quality than an enlargement from a low resolution digital camera at VGA quality.

In addition, the digital image processing history may not be known. That is, the digital image may have been previously digitally manipulated, for example, by limiting the color palette or by compressing the file in a manner that is not visually lossless. Artifacts may be incorporated into the image as a byproduct of the compression technique. Accordingly, it may be difficult to provide a numerical evaluation of "quality" as the system may not be able to assess/comprehend the extent of the manipulations previously made as compared to the original image.

Still further, the resolution of the output device can affect the perceived quality of the output image product. The output device may also limit the output size without replicating or modifying the original image, for example, by pixel replication, padding, enhancement, or interpolation.

Yet further, another factor is the subject matter of the digital image. For example, in certain circumstances, a poor quality reproduction may be preferred to none at all. For example, when the user has strong emotional ties with an image because of the subject matter of the image. In addition, a poor quality reproduction may be the wish of the user if the desire is to convey comedic effect.

Accordingly, a need continues to exist for a system and method of processing a digital image for user assessment of an output image product which recognizes that the appreciation of image quality may differ between users. Such a system and method should be suitable for images scanned from a film negative, images captured digitally, and images which may have been previously digitally manipulated. The system and method needs to recognize that the selected output format has an effect on image quality. The system and method should be suitable for an imaging device (such as a Kodak Picture Maker manufactured by Eastman Kodak Company) as well as a digital image capture device such as a digital camera.

SUMMARY OF THE INVENTION

An object of the present invention is to provide a system and method of processing a digital image for user assessment of an output image product.

Another object of the present invention is to provide such a system and method which recognizes that the appreciation of image quality differs from user to user.

A further object of the present invention is to provide such a system and method which is suitable for images scanned from film negatives, images captured digitally, and images which may have been previously digitally manipulated.

Still another object of the present invention is to provide such a system and method which is suitable for an imaging device and a digital image capture device.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an imaging system for processing a digital image for user assessment of an output image product intended to be generated using the digital image. The imaging system comprises (a) means for accessing the digital image; (b) means for selecting the output image product intended to include the digital image; (c) a processor for digitally modifying at least a portion of the digital image to produce a substantially accurate representation of at least a portion of the output image product; and (d) a viewing member for displaying, for assessment by the user, the substantially accurate representation of the at least a portion of the output image product.

According to another aspect of the invention, there is provided a method of processing a digital image for user assessment of an output image product intended to be generated using the digital image. The method comprises the steps of: (a) accessing the digital image using an imaging device having a viewing member; (b) selecting the output image product intended to include the digital image; (c) digitally modifying at least a portion of the digital image using the imaging device to produce a substantially accurate representation of at least a portion of the output image product; and (d) displaying, using the viewing member, for assessment by the user, the substantially accurate representation of the at least a portion of the output image product.

According to a further aspect of the invention, there is provided a method of processing a digital image for user assessment of an output image product intended to be generated using the digital image. The method comprises the steps of: (a) accessing the digital image using an imaging device having a viewing member comprising a first and second display portion; (b) selecting the output image product intended to include the digital image; (c) digitally modifying at least a portion of the digital image using the imaging device to produce a substantially accurate representation of at least a portion of the output image of the output image product; (d) displaying, in the first display portion, for assessment by the user, the substantially accurate representation of the at least a portion of the output image; and (e) displaying, in the second display portion, a reference image for comparative assessment by the user.

According to yet another aspect of the invention, there is provided a method of processing a digital image captured using a digital camera wherein a resolution of the captured digital image is higher than a display of the digital camera so as to provide a user with a representation of the captured image for image assessment. The method comprises the steps of: (a) displaying the captured digital image in a display of the digital camera, the display having a predetermined resolution, the captured digital image having a test area comprised of at least a portion of the captured digital image; and (b) displaying, using the display, the test area at a resolution between about one-half to about two times the predetermined resolution to provide the user with a representation of an output image which would be produced using an output device.

According to yet a further aspect of the invention, there is provided a method of processing a digital image captured using a digital camera wherein a resolution of the captured digital image is higher than a display of the digital camera so as to provide a user with a representation of the captured image for image assessment. The method comprises the steps of (a) displaying the captured digital image in a display of the digital camera, the display having a predetermined resolution, the captured digital image having a test area comprised of at least a portion of the captured digital image; and (b) displaying, using the display, the test area at the predetermined resolution to provide the user with a representation of an output image which would be produced using an output device.

According to yet still another aspect of the invention, there is provided a method of processing a digital image captured using a digital camera to provide a user with a representation of the captured image for image assessment. The method comprises the steps of (a) displaying the captured digital image in a display of the digital camera, the captured digital image having a test area comprised of a portion of the captured digital image, the display having a predetermined display resolution and a first and second display portion; (b) displaying, in the first display portion, the test area at the predetermined display resolution to provide the user with a representation of an output image which would be produced using an output device; and (c) displaying a reference image in the second display portion for comparative assessment by the user.

The present invention provides a system and method of processing a digital image for user assessment of an output image product which recognizes that the appreciation of image quality may differ between users. The invention also provides a system and method of processing a digital image for user assessment of an output image product which recognizes that the selected output format has an effect on image quality. The system and method is suitable for images scanned from a film negative, images captured digitally, and images which may have been previously digitally manipulated. The system and method is suitable for an imaging device and a digital image capture device such as a digital camera.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
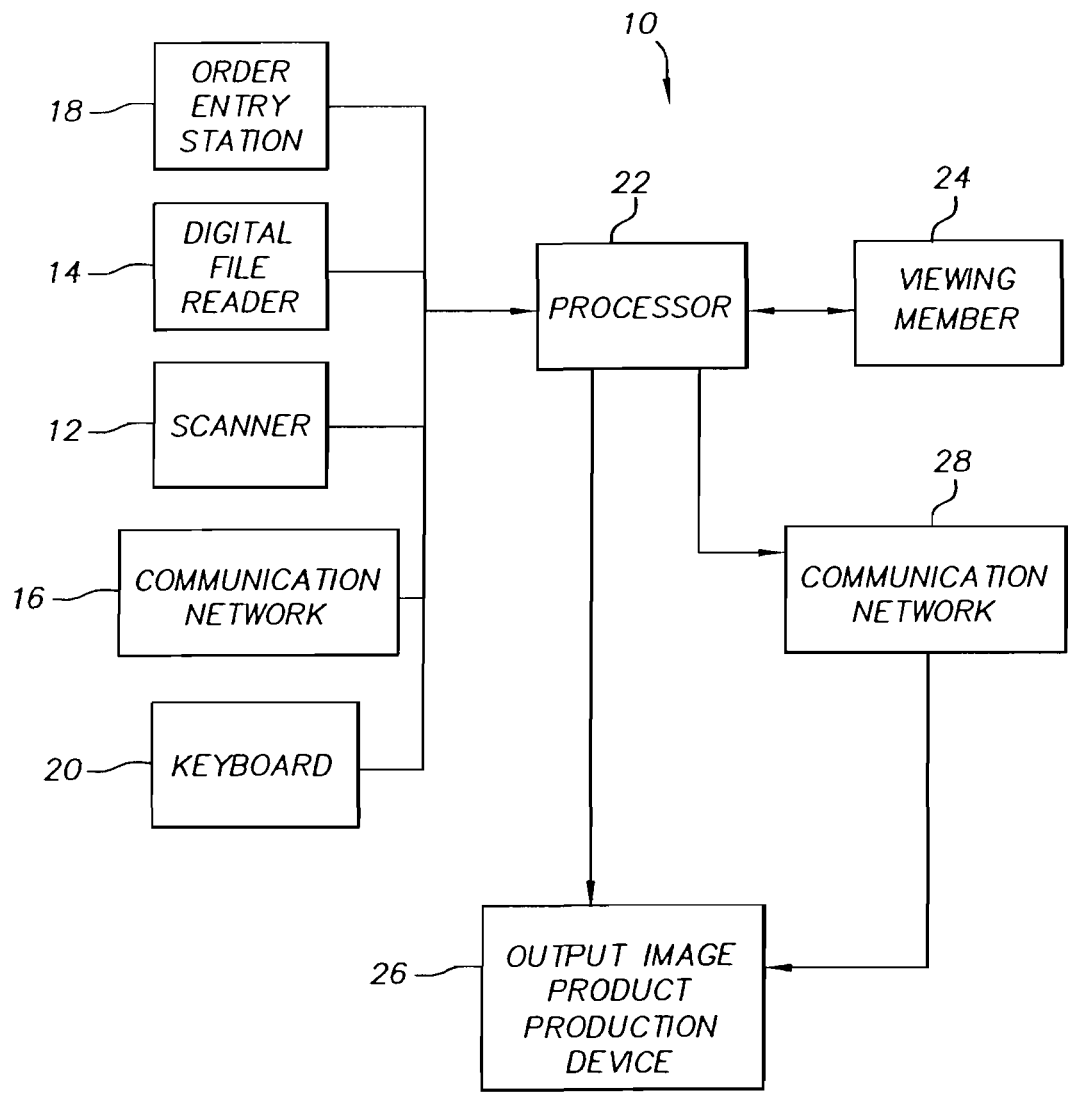
FIG. 1 shows a schematic of an imaging device 10 for processing a digital image for user assessment of an output image product intended to be generated using the digital image in accordance with the present invention.

The following is a detailed description of the preferred embodiments of the invention, reference being made to the drawings in which the same reference numerals identify the same elements of structure in each of the several figures.

FIG. 1 provides a schematic of an imaging device 10 for processing a digital image for user assessment of an output image product intended to be generated using the digital image in accordance with the present invention. The digital image to be processed can be accessed by imaging device 10 by a variety of input means. A visual image can be scanned using a scanner 12 and the scanned signals converted into digital image data. Alternatively, scanner 12 can scan a film strip and convert the scanned signals into digital image data. Other possible input devices include a digital file reader 14 which may read digital data from a variety of sources, including a digital camera, CD, zip disc, memory card, removable media, or a floppy disc. Alternatively, the digital image could be accessed by means of a communications network 16 which receives digital file data from a remote, central source or service.

Imaging device 10 might include an order entry station input device 18 which scans a user's film and accepts order instructions, including print aspect ratio, size, zoom, crop and magnification instructions.

Imaging device 10 may include selection means, such as a data entry device or keyboard 20, for receiving instructions or information from a user. Keyboard 20 can be used to select an output image product intended to include the digital image. The output image product can be a product comprising an image. For example, a hardcopy print produced by means of an appropriate printer, such as an optical printer, digital printer, ink jet printer, thermal printer, or other known printer system. The output image product can also be a mug, tee-shirt, CD, or other product comprising an image.

Imaging device 10 further includes a processor 22 and a display or viewing member 24. Processor 22 receives the digital image and processes at least a portion of the digital image, as will be described in detail below. Viewing member 24, for example a monitor or other display screen, displays the processed digital image. Alternatively, viewing member 24 can be a printer adapted to produce a hardcopy print.

If an output image product is to be produced, an output image product production device 26 is directly accessible from processor 22, or indirectly by means of a communications network 28.

Figure 2:
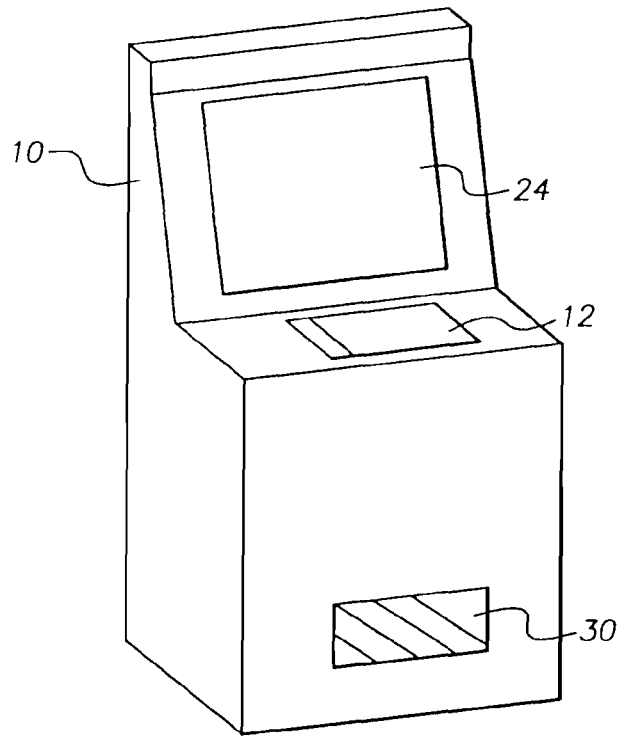
FIG. 2 shows an imaging device illustrated as a kiosk.

One example of imaging device 10 is a digital camera. Another example of imaging device 10 is a kiosk, such as a Kodak Picture Maker manufactured by Eastman Kodak Company, generally illustrated in FIG. 2. As illustrated in FIG. 2, imaging device 10 further includes a delivery area 30 for delivering an output image product to a user. Those skilled in the art will recognize that a home computer may be employed. Further, the home computer may be networked to a server or other remote device to practice the present invention.

Therefore, imaging device 10 for processing a digital image for user assessment of an output image product intended to be generated using the digital image, comprises (a) input means for accessing the digital image; (b) selection means for selecting the output image product intended to include the digital image; (c) processing means for digitally modifying at least a portion of the digital image using the imaging device to produce a substantially accurate representation of at least a portion of the output image product; and (d) a viewing member for displaying the substantially accurate representation of the at least a portion of the output image product for assessment by the user. Imaging device 10 can further comprise query means for querying the user as to whether to generate the output image product.

Figure 3:
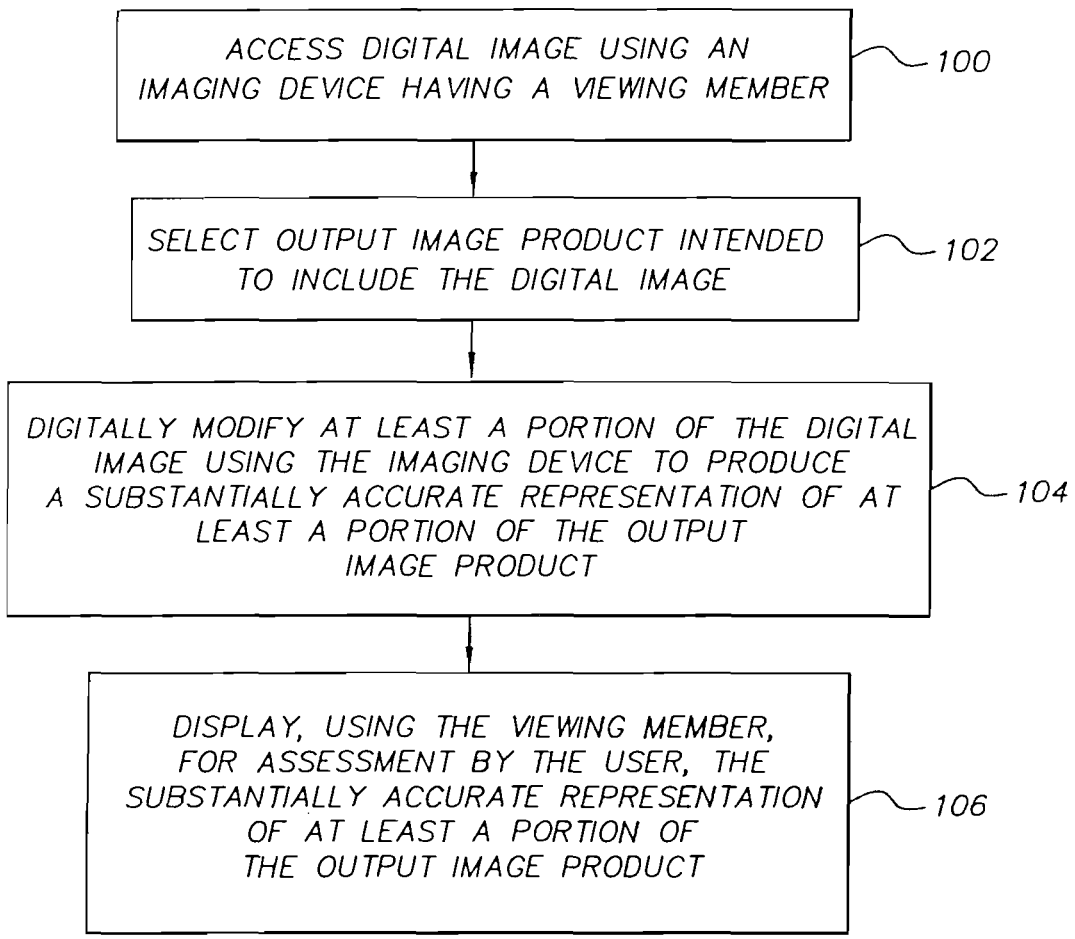
FIG. 3 shows a flow diagram of a first method in accordance with the present invention of processing a digital image for user assessment of an output image product intended to be generated using the digital image.

FIG. 3 shows a flow diagram of a first method in accordance with the present invention of processing a digital image for user assessment of an output image product intended to be generated using the digital image. As indicated above imaging device 10 includes viewing member 24. A user accesses a digital image using imaging device 10 having viewing member 24 (step 100). As disclosed above, the step of accessing the digital image can be accomplished by scanning a visual image or filmstrip to produce the digital image, or by downloading the digital image over communications network 16. In addition, the step of accessing the digital image can be accomplished by accessing the digital image from a removable medium, such as a memory card.

It is understood that, if imaging device 10 is a kiosk, a digital camera can be in communication with imaging device 10. Then, the step of accessing the digital image can be accomplished by accessing the digital image from the digital camera in communication with the imaging device. Similarly, if imaging device 10 is a digital camera, the step of accessing the digital image can be accomplished by capturing the digital image using the digital camera.

At step 102, the user selects the output image product intended to include the digital image. The output image product can include prints, reprints, poster, floppy disc, a mug, tee-shirt, CD, or other product comprising the image. The output image product may be limited to a digital image file for storage, which is typically the situation when capturing an image using a digital camera.

The user selects the output image product since the quality of the outputted image on the output image product will be affected by the output product. For example, if the output product is an 8×10 print, and the printer is a dot matrix printer (i.e., the output image product production device) of a low quality (i.e., small number of dots per inch), the image quality will not be as high as if the printer is of a high quality (i.e., a higher number of dots per inch). Similarly, a dot matrix printer will yield a different quality than, for example, a thermal printer. However, if the output image product is a mug, as compared to a print, the output image product production device may have a limited effect on the output image product since the limits of the output image product are dependent on the output medium.

Processor 22 then digitally modifies at least a portion of the digital image to produce a substantially accurate representation of at least a portion of the selected output image product (step 104). That is, processor 22 creates a substantially accurate representation of the output image product that would be created using the digital image. Not all of the output image product need be created; only a portion may be created.

At step 106, the substantially accurate representation of the output image product is displayed, using viewing member 24. The user is then able to view the display to make an assessment. The user can assess the substantially accurate representation of the output image product for a variety of conditions, for example, overall quality, sharpness, content, color, tone scale, contrast, saturation, artifacts (such as dust, red-eye, scratches, clipping, anomalies from compression or other forms of digital processing), density (lightness/darkness), dynamic range, and composition. The user can assess the attributes of the image to determine if the quality of the image is satisfactory. For example, the manipulation of the image may entail "zooming in" to a small portion of the image. The user can view the manipulated portion of the image and assess if the sharpness or focus of the image is adequate for the user's needs.

One means for creating the substantially accurate representation is to display pixels of the captured digital image at the resolution of viewing member 24. For example, if the captured digital image has a resolution of 1000×1000, and the resolution of viewing member 24 is 100×100, then viewing member 24 will show 1/100 of the pixels of the full captured digital image. The term "substantially" indicates that there may be a variance, possibly up to 10 percent of the captured digital image, between the captured digital image and the representation displayed in viewing member 24. Note that in this example, the output image product selected is a digital file representing the scene. This may be the default output image product selection of the digital camera.

It is understood that mismatches between color encoding from capture to display may necessitate the pixels as displayed on viewing member 24 be modified slightly from the manner in which they are captured. The captured digital image and the substantially accurate representation need not be a literal 1-to-1 match. The arrangement of colored pixels of the capture means is often different than the arrangement of colored pixels of the viewing member. Thus, a true 1-to-1 may not be possible or desirable.

The method diagramed in FIG. 3 can be employed with an image which has been previously manipulated. Since the user assesses the representation, the method recognizes that appreciation of image quality may differ between users. In addition, the method is suitable for images scanned from a film negative, images captured digitally, and images which may have been previously digitally manipulated.

Figure 4:
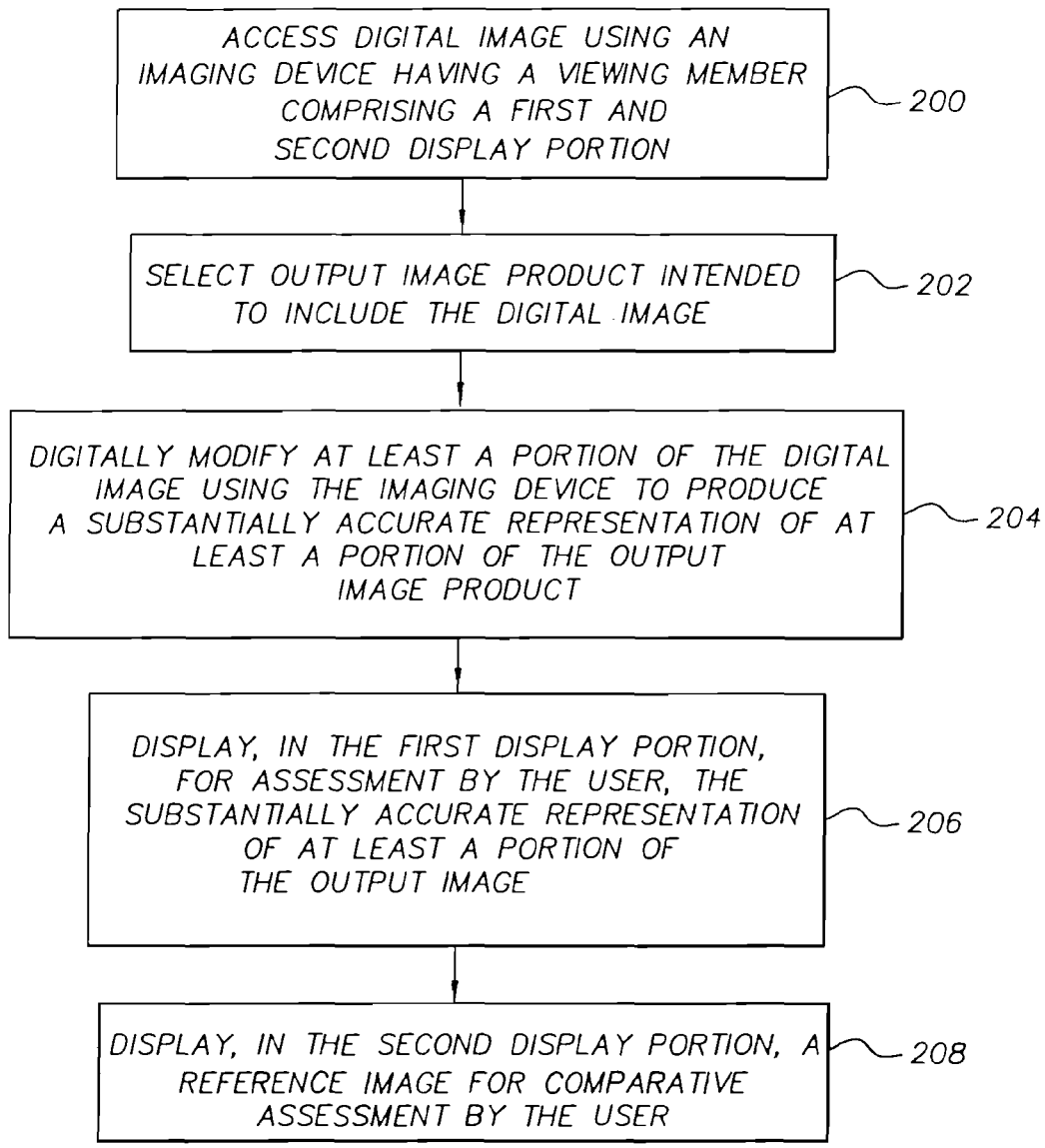
FIG. 4 shows a flow diagram of a second method in accordance with the present invention of processing a digital image for user assessment of an output image product intended to be generated using the digital image wherein a comparative image is provided.

The user may desire to have a reference image by which to compare the substantially accurate representation. FIG. 4 shows a flow diagram of a second method in accordance with the present invention of processing a digital image for user assessment of an output image product intended to be generated using the digital image wherein a comparative image is provided. At step 200, the digital image is accessed using imaging device 10. Imaging device 10 includes viewing member 24 comprising a first and second display portion. The output image product intended to include the digital image is selected (step 202). Processor 22 is used to digitally modify at least a portion of the digital image to produce the substantially accurate representation of at least a portion of the output image of the output image product (step 204). The substantially accurate representation of the at least a portion of the output image is displayed in the first display portion, for assessment by the user (step 206). A reference image is displayed in the second display portion for comparative assessment by the user (step 208). The user can compare the attributes of the reference image to the attributes of the captured image to determine if the quality of the captured image is satisfactory. For example, the manipulation of the captured image may entail "zooming in" to a small portion of the captured image. The reference image can be a small portion of an image that was taken by a skilled photographer under good conditions. The user can compare his/her captured image to the reference image and assess if the sharpness or focus of the captured image is adequate for the user's needs. Note that the reference image need not represent the absolute highest quality of which the device is capable, but rather, could represent an example of characteristic quality in the hands of a semi-skilled user.

Alternatively, the reference image may be displayed time sequentially with the manipulated portion of the captured image. For example, the viewing member may alternate displaying the manipulated portion of the captured image and the reference image.

The reference image can be supplied by the user, or by a manufacturer of imaging device 10. If the reference image is supplied by the user, it may be an image selected by the user from among satisfactory images accessed by the imaging device 10. A selection means such as an interactive software application can be provided.

Using object recognition software, the reference image can be of a similar content/subject/object as the captured image. For example, if the captured image contains the face of a person, the reference image could also contain a face. If the image is a close-up of a face, the reference image may be an image of an eye. The reference image may be selected by the user or by an application running on imaging device 10 that attempts to assess the content of the captured image.

Alternatively, the reference image can be derived from a computer-generated object. That is, a computer model of an object similar to the captured image may be used to construct a reference image that represents an image captured by a photographic expert using the capture device which in this case is imaging device 10.

The reference image can comprise an acceptable image quality, thereby providing the user with a level of quality by which to compare/assess the representation. This acceptable image quality may not be the highest quality possible using the imaging device, but rather of a quality typically found acceptable by users of the imaging device.

For ease of comparison, the reference image can comprise substantially similar content to the content of the digital image, or be of similar color/hue. Image recognition software, known to those skilled in the art, could be employed to discern the image content and color/hue. The reference image may also be of geometric patterns similar to those detected in the captured image.

As disclosed above, imaging device 10 can be a digital camera (i.e., a digital image capture device). Digital cameras typically have a small display of low resolution. When the entire captured image is displayed, it is often difficult to determine if the captured image is in focus. If the digital camera has been moved during the capture, the display may show an image that looks acceptable while in fact it is blurred. This blurring might not be detected via the display of the entire captured image.

Figure 5:
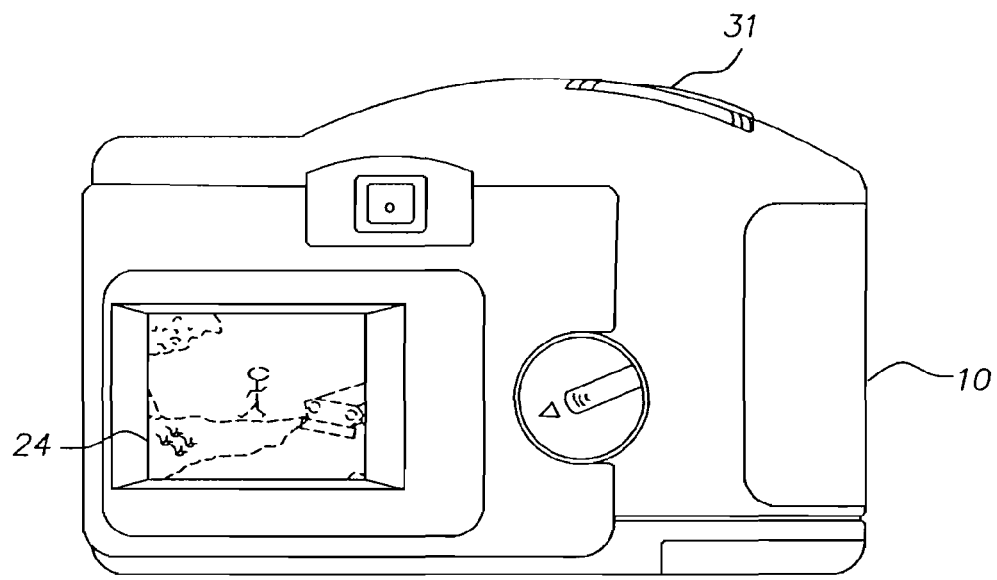
FIG. 5 shows a rear view of a digital camera wherein a captured image is shown in the viewing member.

FIG. 5 generally shows a rear view of a digital camera wherein a captured image is shown in viewing member 24. A user initiates capture of the image by pressing an activation member 31, such as a shutter button, on the digital camera. The image is captured by the digital camera using methods known to those skilled in the art, and stored in memory.

The resolution of a captured image stored in the memory can be higher than the resolution of viewing member 24 of the digital camera. As such, when the captured image is displayed in viewing member 24, it may not be at the resolution which would be provided as an output image product. Accordingly, to provide a user with a representation of the captured image for image assessment, a method, shown in the flow diagram in FIG. 6, is provided using the illustration of FIG. 5.

Figure 6:
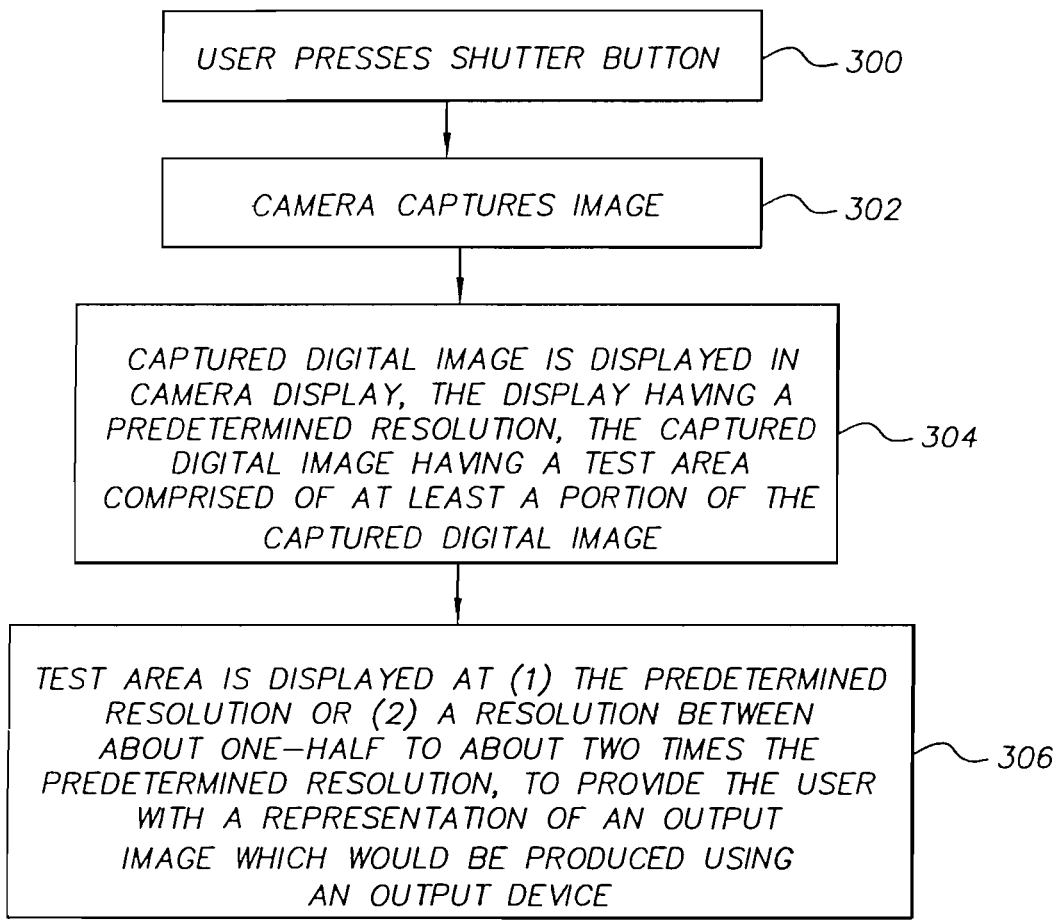
FIG. 6 shows a flow diagram of a third method in accordance with the present invention of processing a digital image for user assessment of an output image product intended to be generated using a digital image captured and viewed using a digital camera.

In step 300 of FIG. 6, the user presses shutter button 31, wherein the digital camera captures the image (step 302). The captured image is then displayed in viewing member 24, as illustrated in FIG. 5 (step 304). Viewing member 24 has a predetermined resolution. In addition, the captured digital image has a test area comprised of at least a portion of the captured digital image. Using viewing member 24, the test area is displayed at either (1) the predetermined resolution or (2) a resolution between about one-half to about two times the predetermined resolution (step 306) so as to provide a substantially accurate representation of at least a portion of the output image product. This display of the test area provides the user with a representation of an output image which would be produced using an output device.

Figure 7:
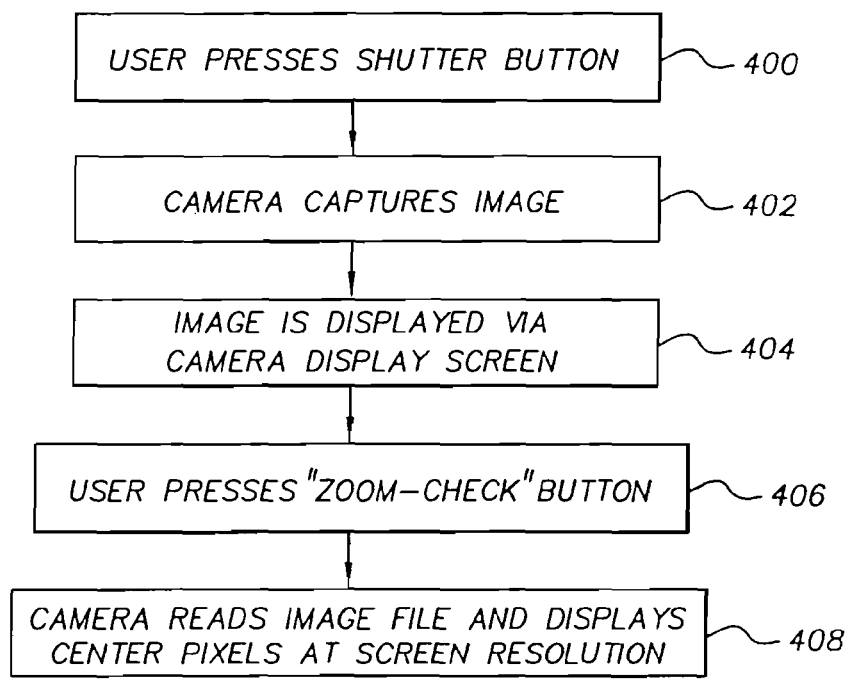
FIG. 7 shows a flow diagram of a fourth method in accordance with the present invention of processing a digital image for user assessment of an output image product intended to be generated using a test area of the captured digital image.

The test area can comprise any portion of the captured image. For example, the test area can comprise a center portion of the captured image, the method of which is illustrated in FIG. 7. In step 400 of FIG. 7, the user presses shutter button 31, wherein the digital camera captures the image (step 402). The captured image is then displayed in viewing member 24 (step 404). The user indicates the desire to obtain a substantially accurate representation of the image captured, and indicates this desire by pressing a "check" button, "zoom-check" button, or other activation member to continue the method of the present invention (step 406). Alternatively, the digital camera may automatically default to a "check" condition. The default test area is the center pixels of the captured image, accordingly, the digital camera reads the digital image file and displays the center pixels at either (1) the predetermined resolution or (2) a resolution between about one-half to about two times the predetermined resolution (step 408), so as to provide the user with a representation of an output image which would be produced using an output device.

Figure 8:
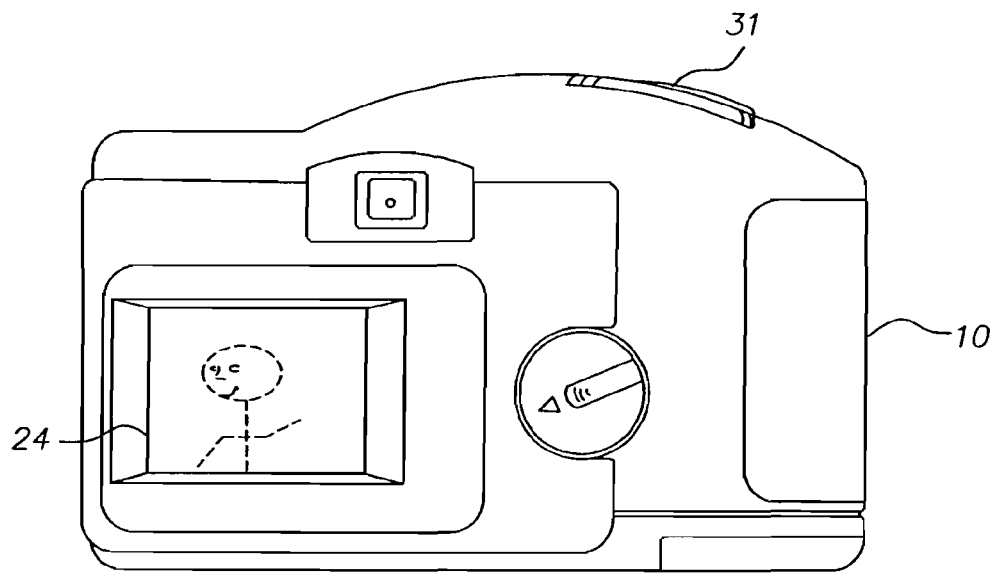
FIG. 8 shows the rear view of the digital camera of FIG. 5 wherein a test area is displayed in the viewing member.

The method of FIG. 7 is shown by example in FIGS. 5 and 8. FIG. 5 shows a captured image of a person in a nature scene (captured at step 402 and displayed at step 404). FIG. 8 displays the center pixels of the captured image (step 408), that is, a portion of the person.

The test area need not be limited to the center pixels. For example, the test area can be selected by the user. If selected by the user, the selection may be affected by the image which was captured. That is, the user may configure the test area to comprise the focal point of the captured image.

Alternatively, the digital camera can select the test area in accordance with predetermined parameters. If selected by the digital camera, the parameters could include color, hue, contrast, and object recognition. Object recognition software might select a test area having a highest frequency content, or select a test area that comprises what is most likely a face by detecting likely flesh-tones or other means of face recognition.

Figure 9:
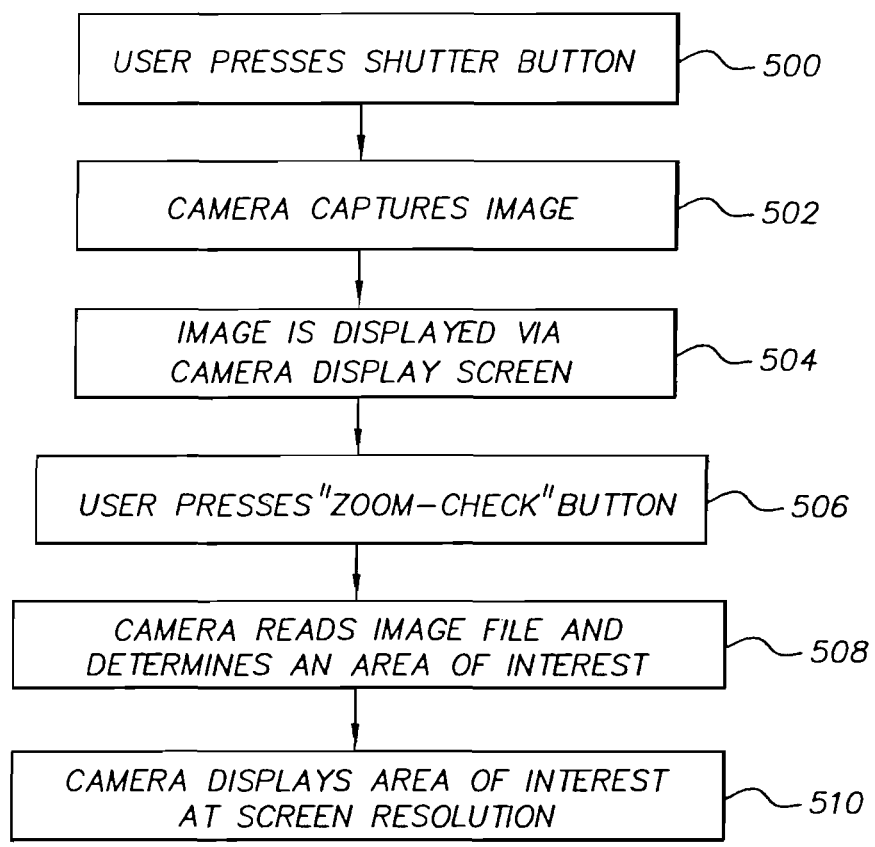
FIG. 9 shows a flow diagram of a fifth method in accordance with the present invention of processing a digital image for user assessment of an output image product intended to be generated using the digital image wherein the digital camera selects the test area in accordance with predetermined parameters.

This method is illustrated in FIG. 9. In step 500 of FIG. 9, the user presses shutter button 31, wherein the digital camera captures the image (step 502). The captured image is then displayed in viewing member 24 (step 504). The user indicates the desire to obtain a substantially accurate representation of the image captured, and indicates this desire by pressing a "check" button, "zoom-check" button, or other activation member to continue the method of the present invention (step 506). The test area is determined by the digital camera, based on predefined parameters (step 508). Accordingly, the digital camera reads the digital image file and displays the pixels of the test area at either (1) the predetermined resolution or (2) a resolution between about one-half to about two times the predetermined resolution (step 510), so as to provide the user with a representation of an output image which would be produced using an output device.

As an optional feature, the digital camera may provide an indication to the user of the resolution at which the image is being displayed. For example, an indication that the test area is being displayed at the predetermined resolution, and/or identify the predetermined resolution. Such an indication may be provided using viewing member 24 or other means known to those skilled in the art. The indication may be of numerical value, or may visually demonstrate the portion of the image that is being substantially accurately represented.

Figure 10:
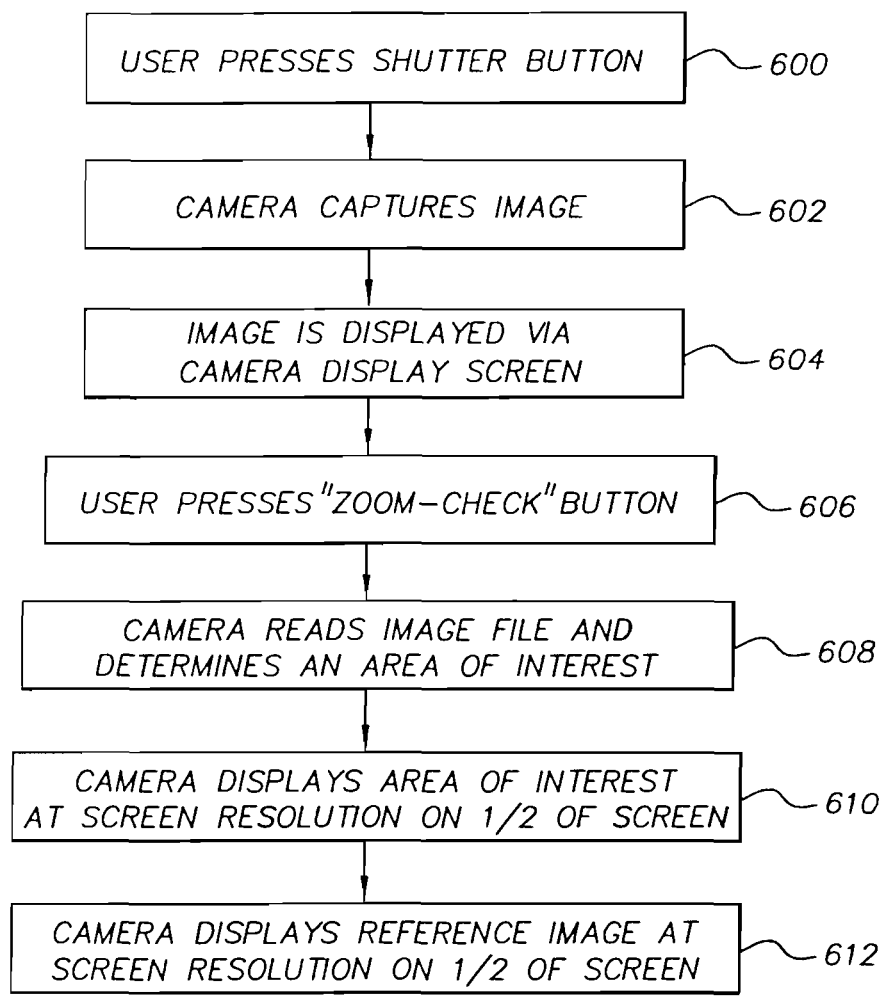
FIG. 10 shows a flow diagram of a sixth method in accordance with the present invention of processing a digital image for user assessment of an output image product intended to be generated using the digital image wherein the digital camera provides a reference image.

When imaging device 10 is a digital camera, the user may desire to have a reference image by which to compare the substantially accurate representation. FIG. 10 shows a flow diagram of a method in accordance with the present invention of processing a digital image wherein the digital camera provides such a reference image. In step 600, the user presses shutter button 31, wherein the digital camera captures the image (step 602). The captured image is then displayed in viewing member 24 (step 604). The user indicates the desire to obtain a substantially accurate representation of the image captured, and indicates this desire by pressing a "check" button, "zoom-check" button, or other activation member to continue the method of the present invention (step 606). The test area is determined by the digital camera, based on predefined parameters (step 608). Accordingly, the digital camera reads the digital image file and displays the test area in one portion of viewing member 24 (step 610), and displays a reference image in a second portion of viewing member 24 (step 612).

Figure 11:
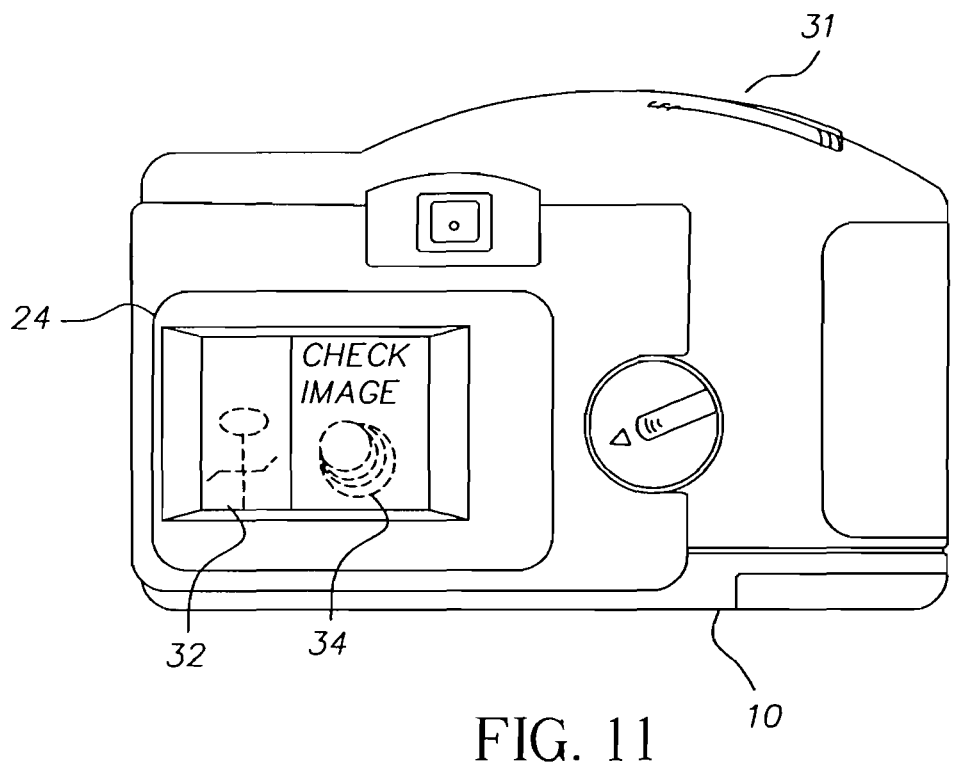
FIG. 11 shows the rear view of the digital camera of FIG. 5 wherein the viewing member comprises a first and second display portion.

The method of FIG. 10 is shown by example using FIGS. 5 and 11. As illustrated, viewing member 24 has a predetermined display resolution, a first display portion 32, and a second display portion 34. The captured digital image is displayed in viewing member 24, as illustrated in FIG. 5. Then, when the user activates the activation member 31, the test area is displayed in first display portion 32, and the reference image is displayed in second display portion 34.

As disclosed above, the test area can comprise any portion of the captured image, including for example, the user selecting the test area, the test area comprising a center portion of the captured image, and the digital camera selecting the test area in accordance with predetermined parameters.

In addition, the reference image can be supplied by the user, comprise an acceptable image quality, comprise substantially similar content to the content of the digital image, be supplied by a manufacturer of the imaging device, be derived from a computer generated object, comprise a resolution substantially equal to the predetermined display resolution, and/or comprise a resolution ranging from about minus (−) 20 percent to about plus (+) 20 percent of the predetermined display resolution.

Figure 12:
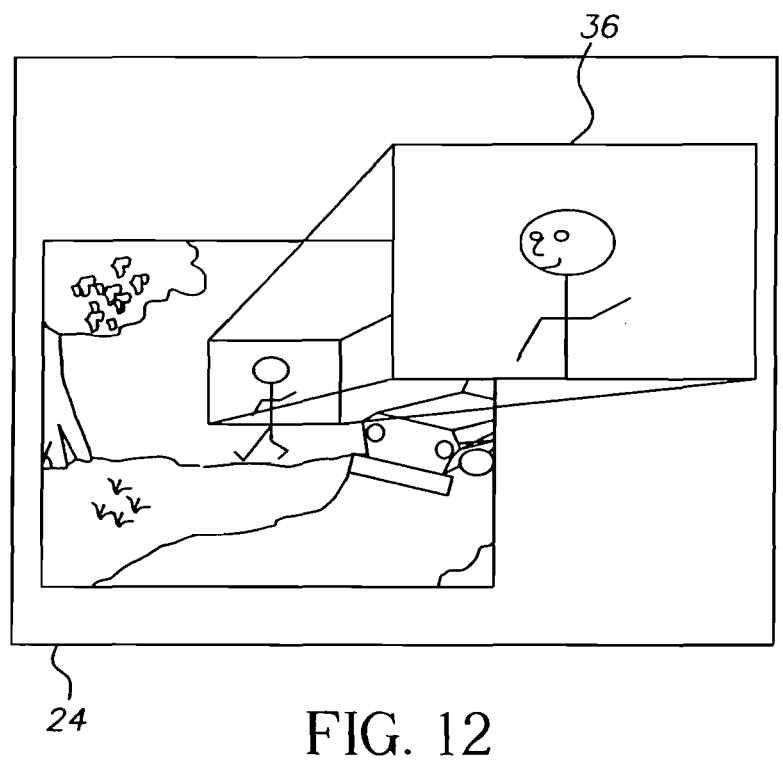
FIG. 12 shows a viewing member illustrating an "exploded" representation superimposed on the captured image.

An alternative to displaying the substantially accurate representation solely in viewing member 24, is to "explode" the representation from the captured image, and superimpose the representation on the captured digital image, such as illustrated in FIG. 12. In FIG. 12, a balloon box 36 displays the representation. In this manner the "check" image is displayed at the same time as a substantial portion of the entire captured image. Such an arrangement may provide the user with a better or more comprehensive appreciation of the portion of the captured image from which the "check" image has been derived.

Further, imaging device 10 may be configured to display a plurality of representations, wherein each representation is of a different portion of the captured image. The displayed representations might be displayed in viewing member 24 in a random or predetermined manner.

Accordingly, there are various limiting factors: (1) the input is resolution limited, (2) the output is resolution limited, (3) the display screen is resolution limited, and (4) the output image product may cause a distortion.

An example of limited input resolution is the enlargement of a photograph from a wallet size photo to a 20×30 inch size. For example, if a wallet size photo is scanned at a kiosk and the user selects a 20×30 size output, a portion of the scanned image is manipulated such that a representation of a portion of the 20×30 output is displayed on viewing member 24. The viewing member shows a 7×7 portion of the resulting output, which is resolution limited due to the enlarging of the input image by a factor of 10. The 7×7 representation of the resulting output will, by necessity, show large pixels or a very blurry representation of the original image.

An example of limited output resolution is the transfer of an image to a tee shirt. For example, if an 8×10 photo is scanned at a kiosk and the user selects a tee shirt output, a portion of the scanned image is manipulated such that a representation of a portion of the tee shirt output is displayed on viewing member 24. The viewing member shows a 7×7 portion of the resulting output, which is resolution limited due to the low resolution of the tee shirt transfer process. The 7×7 representation of the resulting output will by necessity show a representation of the original image that is more blurry than the original.

An example of the display screen being limited is a low resolution monitor. This situation is similar to the camera examples described above.

An example of the output image product causing distortion is the creation of a mug. For example, if a 4×6 photo is scanned at a kiosk and the user selects a mug output, a portion of the scanned image is manipulated such that a representation of a portion of the mug output is displayed on viewing member 24. The viewing member shows the resulting output as it will appear on the mug, which is resolution limited due to the low resolution of the mug transfer process. Additionally, the representation will show the image distorted as it will be by the cylindrical shape of the mug. Furthermore the dynamic range of the scanned image will be decreased due to the limited dynamic range of the mug transfer process.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention. A computer storage product having at least one computer storage medium having instructions stored therein can cause one or more computers to perform any of the methods disclosed herein.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 imaging device
12 scanner
14 digital file reader
16 communications network
18 order entry station input device
20 data entry device; keyboard
22 processor
24 viewing member
26 output image product production device
28 communications network
30 delivery area
31 shutter button; activation member
32 first portion
34 second portion
36 balloon box

What is claimed is:

1. A method comprising:
  accessing a digital image by an imaging device having a display comprising a first display portion and a second display portion;
  identifying an output image product that is to include at least a first portion of the digital image wherein parameters of the output image product relate to an appearance of the digital image in the output image product;
  generating an adjusted digital image by digitally modifying at least a second portion of the digital image, wherein the modifying is based at least in part on the parameters of the output image product, wherein the adjusted digital image represents how the digital image would appear in at least a portion of the output image product;
  displaying the adjusted digital image in the first display portion;
    identifying a reference image that has been predetermined to have at least one desired quality;
    generating an adjusted reference image by digitally modifying at least a portion of the reference image based at least in part on the parameters of the output image product; and
  displaying the adjusted reference image in the second display portion.

2. The method of claim 1, wherein the reference image is supplied by a user.

3. The method of claim 1, wherein the at least one desired quality comprises an acceptable image quality.

4. The method of claim 1, wherein content of the adjusted reference image is substantially similar to content of the adjusted digital image.

5. The method of claim 1, wherein the reference image is supplied by a manufacturer of the imaging device.

6. The method of claim 1, wherein the reference image is derived from a computer generated object.

7. The method of claim 1, wherein the imaging device is a digital camera, and wherein the output image product is digital memory of the digital camera.

8. The method of claim 1, wherein the imaging device is a kiosk.

9. The method of claim 1, wherein the output image product is at least one of a mug or a shirt.

10. The method of claim 1, wherein the digital image is captured by a digital camera of a user that is a model of a manufacturer and the reference image is captured by a digital camera of an expert that is the model of the manufacturer.

11. The method of claim 1, wherein the digital image comprises a geometric pattern that is substantially similar to a geometric pattern of the reference image.

12. The method of claim 1, wherein the digital image comprises a first image of a first scene, the reference image comprises a second image of a second scene, and the first scene is different than the second scene.

13. A system comprising:
a display comprising a first display portion and a second display portion;
first memory configured to store a digital image;
second memory configured to store a reference image that has been predetermined to have at least one desired quality;
an output image product that is to include at least a first portion of the digital image wherein parameters of the output image product relate to an appearance of the digital image in the output image product;
a processor operatively coupled to the display, first memory, and second memory, wherein the processor is configured to:
access the digital image;
identify the output image product;
generate an adjusted digital image by digitally modifying at least a second portion of the digital image, wherein the modifying is based at least in part on the parameters of the output image product, wherein the adjusted digital image represents how the digital image would appear in at least a portion of the output image product;
identify the reference image;
generate an adjusted reference image by digitally modifying at least a portion of the reference image based at least in part on the parameters of the output image product; and
cause the display to display the adjusted digital image in the first display portion and display the adjusted reference image in the second display portion.

14. A non-transitory computer-readable medium having computer-readable instructions stored thereon, the computer-readable instructions comprising:
instructions to access a digital image;
instructions to identify an output image product that is to include at least a first portion of the digital image wherein parameters of the output image product relate to an appearance of the digital image in the output image product;
instructions to generate an adjusted digital image by digitally modifying at least a second portion of the digital image, wherein the modifying is based at least in part on the parameters of the output image product, wherein the adjusted digital image represents how the digital image would appear in at least a portion of the output image product;
instructions to display the adjusted digital image in a first display portion of a display;
instructions to identify a reference image that has been predetermined to have at least one desired quality;
instructions to generate an adjusted reference image by digitally modifying at least a portion of the reference image based at least in part on the parameters of the output image product; and
instructions to display the adjusted reference image in a second display portion of the display.

* * * * *